Feb. 16, 1932.  M. KONZELMAN  1,845,025
AUTOMOBILE BED
Filed July 8, 1927   3 Sheets-Sheet 1

INVENTOR.
Matthew Konzelman,
BY Geo. P. Kimmel
ATTORNEY.

Feb. 16, 1932. M. KONZELMAN 1,845,025
AUTOMOBILE BED
Filed July 8, 1927 3 Sheets-Sheet 2
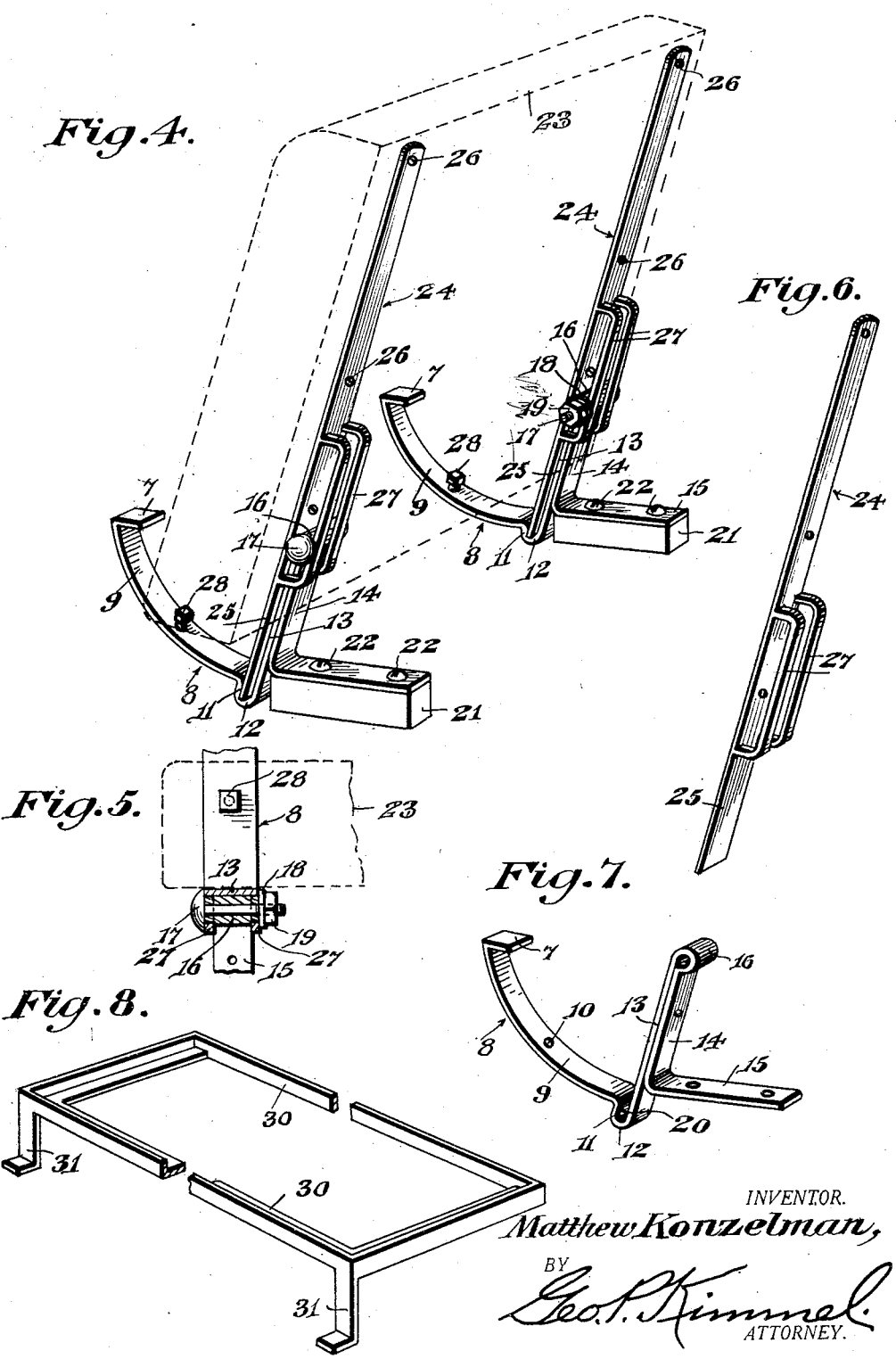
INVENTOR.
Matthew Konzelman,
BY Geo. P. Kimmel.
ATTORNEY.

Feb. 16, 1932.    M. KONZELMAN    1,845,025
AUTOMOBILE BED
Filed July 8, 1927    3 Sheets-Sheet 3
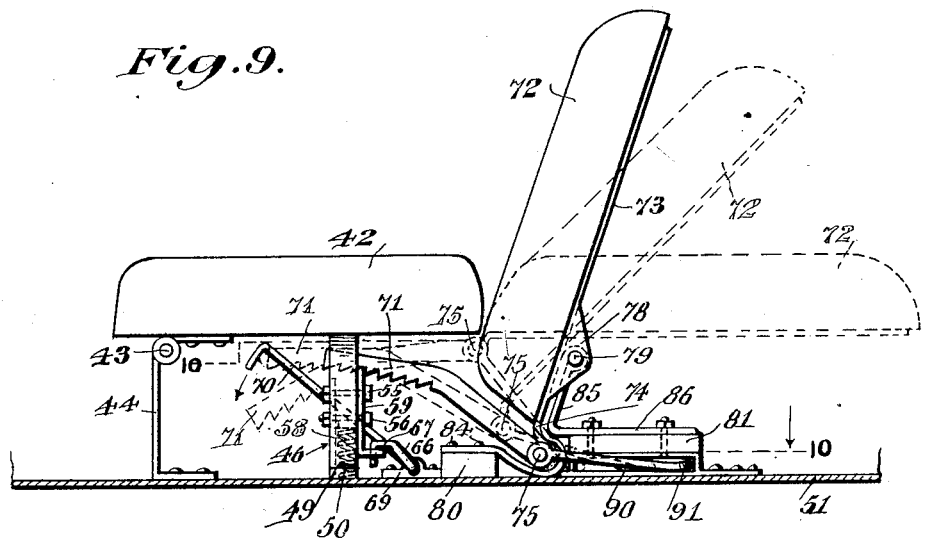
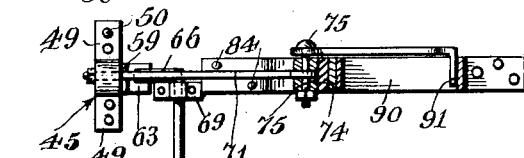
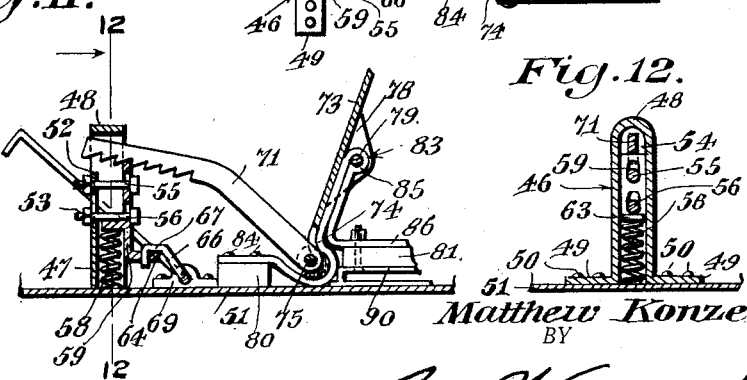
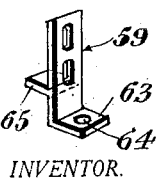
INVENTOR.
Matthew Konzelman,
BY Geo. F. Kimmel
ATTORNEY.

Patented Feb. 16, 1932

1,845,025

UNITED STATES PATENT OFFICE

MATTHEW KONZELMAN, OF PERU, ILLINOIS

AUTOMOBILE BED

Application filed July 8, 1927. Serial No. 204,285.

This invention relates to a convertible structure and more particularly to a combined seat and bed for use in connection with automobiles, and has for its object to provide, in a manner as hereinafter set forth, a convertible structure capable of being employed as the front and rear seats of an automobile and as a bed when desired.

Further objects of the invention are to provide, in a manner as hereinafter set forth, a convertible structure to provide a seat and a bed and which is comparatively simple in its construction and arrangement, strong, durable, thoroughly efficient in its use, expeditiously converted from a seat to a bed or from a bed to a seat, readily installed with respect to the automobile body, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 4 is a perspective view illustrating the supporting means for the back of the front seat and with the back illustrated in dotted lines.

Figure 5 is a fragmentary view in section, of the supporting means for the back of the front seat.

Figure 6 is a perspective view of one of the coupling supports for the back of the front seat.

Figure 7 is a perspective view of one of the supports for the front seat and to which is connected the back of the front seat by a pair of coupling supports, one of which is shown in Figure 6.

Figure 8 is a fragmentary view, in perspective of the shiftable support for the rear seat.

Figure 9 is a side elevation of a front seat and back showing a modified form of hinge connection for the back and with the latter illustrated in dotted lines in adjusted positions.

Figure 10 is a section on line 10—10, Figure 9.

Figure 11 is a sectional elevation of the modified form of hinge construction for the front seat back.

Figure 12 is a section on line 12—12, Figure 11.

Figure 13 is a perspective view of the spring controlled latching member forming an element of the modified form of hinge connection.

Figure 1:
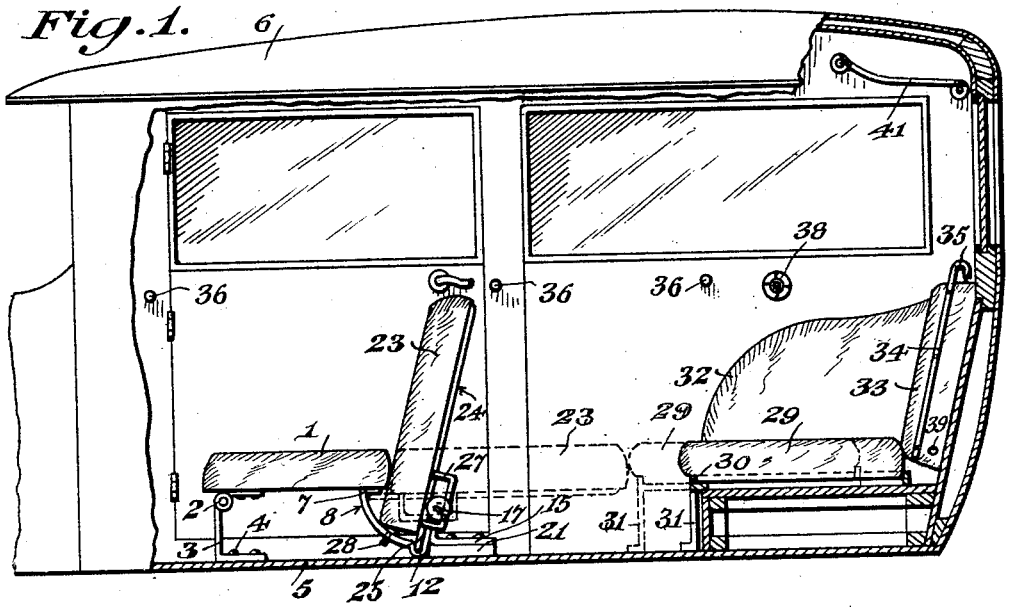
Figure 1 is a fragmentary view partly in section and elevation of an automobile body of the closed car type showing the adaptation therewith of a convertible structure in accordance with this invention and further illustrating in full line the structure arranged as the front and rear seats of the automobile and in dotted lines the bed formation.

Referring to the drawings in detail the front seat 1 is hinged as at 2 to a pair of upstanding brackets 3, only one of which is shown, and said brackets 3 are fixedly secured as at 4 to the floor 5 of the body portion 6 of an automobile of the closed car type. The seat 1 is connected at its forward portion to the brackets 3 so that it can be swung upwardly when desired. The rear of the seat 1 rests upon rearwardly directed flanges 7 provided at the upper end of a pair of stationary supports referred to generally by the reference character 8.

Each support 8 comprises a forward part 9 which is of curved contour and extends upwardly and is provided at its upper end with a rearwardly extending flange 7. The part 8 intermediate its ends is provided with an opening 10 having a threaded wall. The rear end of the part 9 merges into a depending portion 11, which terminates in a rearwardly extended semi-circular part 12, the latter merging into an upstanding rearwardly extending arm 13 which opposes the vertical arm 14 of an angle shaped extension. The latter further includes a rearwardly directed arm 15 which extends from the lower end of the arm 14. The point of joinder between the upper ends of the arms 13 and 14 is in the form of a loop 16 through which extends a headed coupling bolt 17 carrying a washer 18 and a securing nut 19. The depending portion 11, and semi-circular portion 12, in connection with the lower end of the arm 13 provides a socket 20 for a purpose to be presently referred to.

The supporting members are arranged in spaced relation, oppose each other and the arms 15 thereof are seated on blocks 21 which are anchored to the floor 5. Extending through the arms 15 and engaging the blocks 21 are hold-fast devices 22 which fixedly secure the members 8 to the floor 5. The part 9, socket 20 and arm 13 of each support 8 are arranged forwardly of the blocks 21. The portions 12 of each of the supports 8 seat on the floor 5. The arms 13, 14 are directed rearwardly at an inclination from their lower towards their upper ends.

Figure 2:
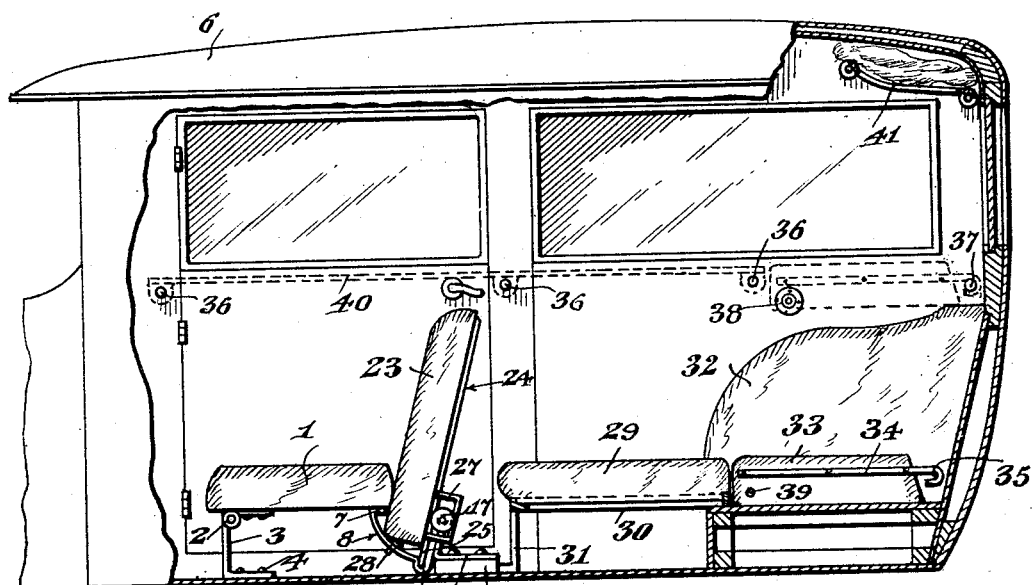
Figure 2 is a view similar to Figure 1 illustrating in full line the convertible structure in seat formation and in dotted line a different arrangement of bed formation from that shown in Figure 1.
Figure 3:
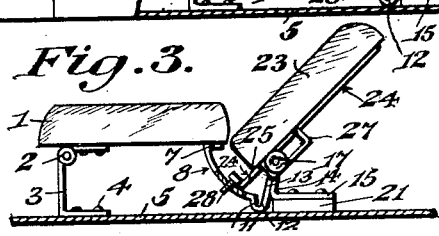
Figure 3 is a side elevation of the front seat and with the back thereof adjusted from normal position.

The back for the front seat 1 is indicated at 23 and is adjustable at an inclination with respect to the seat 1 and further is capable of being disposed in a horizontal plane, see dotted line showing in Figure 1. The back 23 is carried by a pair of coupling supports referred to generally by the reference character 24 and each of said supports consists of a flat bar 25, which is secured by hold-fast devices 26 to the rear face of the back 23 and each of said bars 25 is of a length to extend below the lower end of the back 23. The part 25 at a point between its transverse median and its lower end has formed integral therewith a pair of spaced, opposed yoke-shaped members 27 which are positioned at the ends of the loop 16. The coupling bolt 17 has its head arranged exteriorly of one of the members 27 and the washer 18 and nut 19 are arranged exteriorly of the other member 27. The head of the bolt and the washer 18 and nut 19 provide means for slidably connecting a coupling support to one of the supports 8. The back 23 is maintained in its normal position by the lower end thereof seating on the part 9 of the support 8 and with the lower ends of the bars 25 engaging in the sockets 20 and this arrangement maintains the seat 23 in its normal position as shown in Figure 2. When the seat 23 is adjusted from its normal inclined position to the inclined position shown in Figure 3, the lower ends of the bars 25 abut against stops 28 which adjustably engage with the threaded walls of the openings 10. When the back 23 is adjusted to the horizontal position shown in Figure 1, the stops 28 are removed and the ends of the bars 25 engage under the flanges 7 formed at the upper ends of the parts 9 of the support 8.

The rear seat is indicated at 29, and is carried by a supporting frame 30 having its forward side provided with supporting legs 31. The frame 30 slides between the sides 32 for the rear seat and which can be the sides of the automobile body 6. The back of the rear seat is indicated at 33 and which is removably mounted in position. The back 33 at each side thereof is formed with a bar 34 which projects therefrom and is formed with a hooked shaped terminal 35.

The seat 29 can be shifted to the position shown in Figure 2, and the back 33 can be disconnected from the position shown in Figure 1 and arranged in the position shown in Figure 2 and under such conditions the seat 29 and back 33 will provide a bed. The back 33 can be adjusted to the position shown in Figure 1 and the seat 29 pulled outwardly to dotted line position and under such conditions the seat 1, back 33 and seat 29 will provide a bed.

Each side of the body portion 6 of the automobile is formed with a series of spaced lugs 36, a lug 37 and a fastener device 38. Each side of the back 33 is formed with an opening 39. The back 33 can be supported in the horizontal position, see dotted line in Figure 2, by engaging of the fastening devices 38 in the opening 39, and with the hook shaped terminals 35 engaging over lugs 37. The lugs 36 are provided for connecting with the body 6 of the automobile a canvas 40, see dotted lines shown in Figure 2, and which will form a continuation of the back 33 as shown in dotted lines in Figure 2 and provide a bed. The body 6 of the car can be provided with a rack 41.

The seats 1, 29 and backs 23 and 33 are in the form of cushions. The back 33 can be mounted in the position shown in Figure 2, in dotted lines, and provide a rack, and as before stated it can also form a continuation of the canvas 40. The seat 29 and back 33 can be positioned, as shown in Figure 2 to provide a bed, and with the back 23 in the position to extend in the manner as shown.

Referring to Figures 9 to 13 which illustrate a modified form of hinge connection for the back of the front seat, the latter is indicated at 42, and is hinged as at 43, to a pair of upstanding brackets 44, only one of which is shown. The front seat 43 is hinged in the same manner as the front seat 1.

Arranged below the seat 42, are a pair of spaced, aligning, upstanding casings 45, 46, each having an open rear, a front wall 47 terminating below the casing top 48, and a pair of oppositely extending base flanges 49 for the passage of holdfast devices 50 to secure the casing to the car floor 51. The wall 47 is formed with an opening 52 and a vertical slot 53 below the latter. An opening 54 is provided between the upper end of the front wall 47 and the casing top 48. Extending through the opening 52 and slot 53 are headed bolts 55, 56 respectively. The bolts carry securing nuts 57 and which abut against the outer face of the wall 47. Arranged within each casing is a controlling spring 58 for a latch member 59 which consists of a vertically disposed rectangular body portion 60 provided with a pair of superposed vertically extending slots 61, 62. The body portion 60 is slidably connected to a casing by the pair of bolts 55, 56 which extend through the slots 61, 62 respectively. The heads of the bolts ride against the outer face of said body portion 60, and the latter terminates at its lower end in a right angularly directed flange 63, formed with an opening 64. Extending from and at right angles to the inner face of the body portion 60, above its lower end, is an inwardly directed flange 65 which seats on the upper end of the spring 58. The spring 58 normally tends to maintain the latch member 59 in an elevated position see Figure 11.

Both latch members 59 are shifted downwardly to release position, against the action of their controlling springs 58, by a pair of crank arms 66 having angle shape ends 67 which engage in the openings 64 and seat on the flanges 63. The crank arms 66 are arranged at the opposite ends of a rock shaft 68 journalled in a pair of spaced bearings 69 secured to the car floor 51. Connected to the shaft 68, centrally thereof, is a forwardly directed and upwardly inclined manually operated lever arm 70 for shifting the shaft 68 in one direction, and against the action of the springs 58.

The upper edges of the latch members 59 are bevelled and which engage in rack bars 71 for a purpose to be presently referred to and which are adapted to be shifted through the openings 54.

The back for the front seat 42, is indicated at 72, and which has secured to its rear, as well as depending from its lower end a pair of coupling supports each consisting of a bar 73, having a rearwardly extending lower end 74, to which is hinged, as at 75, by a pivot bolt to the rear end of a rack bar 76. A pivot bolt 77 is provided for connecting the rack bar 78 to the lower end 74 of a coupling support. The bar 73, in proximity to its lower end is formed with a pair of spaced, rearwardly extending ears 78 carrying a pivot pin 79.

Arranged rearwardly of the seat 42, at each end thereof and secured to the floor 61, is a pair of supporting blocks 80, 81, the former being positioned forwardly of and spaced from the latter. The block 80 is secured to the floor 51, and the block 81 upon an inverted yoke-shaped bracket 82, secured to the floor 51.

Mounted upon and secured to the blocks 80, 81, is a combined hinge and supporting element, referred to generally at 83, and consisting of a metallic strap bent to provide a forward directed portion 84, an upstanding intermediate portion 85 and a rearwardly directed portion 86 arranged above the portion 84. The lower end of the intermediate portion 85 and rear end of the portion 84 where they merge into each other are shaped to provide a forwardly opening rearwardly directed loop 87 provided with a cushioning member 88 against which is adapted to abut the rearwardly extending lower end 74 of the bar 73.

The portion 84 of the element 83 has the forward part thereof secured upon the top of the block 80. The portion 86 of the element 83 is secured upon the top of the block 81. The portion 85 of the element 83 extends upwardly and at a rearward inclination with respect to the blocks 80, 81. The upper end of said portion 85 is shaped to provide a loop 89 for the passage of the pivot pin 79, whereby the bar 73 will be hinged to the element 83.

The outer end of the pivot bolt 75 carries a pivoted prop member 90 formed at its rear end with an inwardly extending short arm 91 which travels in the bracket 82. The member 90 acts as a prop to support the back 72 when it is adjusted to a horizontal position as shown in dotted lines in Figure 9.

The latch member 59 and rack bar 71 coact to detachably secure the back 72 in the position to which it is adjusted.

The seat and back shown in Figure 9 may be substituted for the front seat structure shown in Figures 1 and 2.

It is thought the many advantages of a convertible structure, in accordance with this invention, which structure can be employed as a front and rear seat of an automobile and also employed as a bed, can be readily understood, and although the preferred embodiment of the invention is as illustrated and described, yet it is to be understood that changes in the details of construction can be had which will fall within the scope of the invention as claimed.

What I claim is:

1. In a convertible structure for use for automobiles a front seat element, front supports therefor, rear supports for said element, a back element for said seat element normally depending below the rear of the latter, and said back element and rear supports having coacting means below the seat element for maintaining the back element angularly disposed with respect to the seat element and further for maintaining the back element in a horizontal position with respect to the seat element.

2. A convertible structure for use in connection with automobiles of the closed car type and for the purpose set forth a front seat element, front and rear supporting means therefor, a back element for said seat element, and coupling supports secured to said back element, depending therebelow and provided with yoke-shaped members for slidably connecting the back element to said rear supporting means, and said rear supporting means provided with means coacting with said coupling supports for maintaining the back element in angularly adjusted position with respect to the seat element and further for maintaining the back element in horizontal position with respect to the seat element.

3. A convertible structure for use in automobiles comprising a front seat element, supporting means therefor, a shiftable back element for said seat element and free of connection therewith, rear supporting elements for the seat element and each formed with an upstanding rearwardly inclined intermediate portion spaced from said seat element, means for connecting said back element to said intermediate portions to provide for the adjusting thereon of the back element, and means for detachably retaining said back element in adjusted position.

4. A convertible structure for automobiles comprising a front seat element, supporting means therefor, a normally upstanding shiftable back element depending below the seat element and free of connection therewith, rear supporting elements for the seat element and each including an upstanding rearwardly inclined intermediate portion carrying means at its upper end for connecting the back element therewith at a point in proximity to the lower end of the latter, said means providing for the adjusting of the back element relative to the seat element, and means for detachably retaining the back element in adjusted position.

5. A convertible structure for use in automobiles comprising stationary front supporting elements, a seat mounted thereon and hinged thereto, a rear supporting structure for said seat, a back element for the seat element, and said back element and structure having coacting means positioned below the seat element for maintaining the back element in angularly adjusted position with respect to the seat element and further for maintaining the back element in horizontal position with respect to the seat element.

In testimony whereof I affix my signature hereto.

MATTHEW KONZELMAN.